(12) United States Patent
Larkin et al.

(10) Patent No.: US 6,178,012 B1
(45) Date of Patent: Jan. 23, 2001

(54) METHOD AND APPARATUS FOR KEEPING A DOCUMENT IN FOCUS DURING NONCONTACT SCANNING

(75) Inventors: Eric Larkin, San Jose; Ana Chang, Mountain View; David Rinaldis, Sunnyvale; Helen Shaughnessy, Palo Alto, all of CA (US)

(73) Assignee: Silitek Corporation, Taipei (TW)

( * ) Notice: Under 35 U.S.C. 154(b), the term of this patent shall be extended for 0 days.

(21) Appl. No.: 09/118,692

(22) Filed: Jul. 16, 1998

(51) Int. Cl.⁷ ........................................................ H04N 1/04
(52) U.S. Cl. .............................................. 358/474; 358/47
(58) Field of Search ..................................... 358/475, 474, 358/494, 498, 497, 496

(56) References Cited

U.S. PATENT DOCUMENTS

| | | | |
|---|---|---|---|
| 4,394,089 | * 7/1983 | McIntosh et al. | 358/75 |
| 4,583,126 | * 4/1986 | Stoffel | 358/294 |
| 4,783,700 | * 11/1988 | Nagane | 358/494 |
| 4,970,606 | * 11/1990 | Shima | 358/494 |
| 5,446,276 | * 8/1995 | Iyoda et al. | 358/494 |
| 5,526,141 | * 6/1996 | Ogura et al. | 358/496 |
| 5,661,571 | * 8/1997 | Ijuin et al. | 358/471 |
| 5,739,923 | * 4/1998 | Kawahara | 358/474 |
| 5,764,382 | * 6/1998 | Shiraishi | 358/494 |
| 5,805,308 | * 9/1998 | Tanaka et al. | 358/486 |

* cited by examiner

*Primary Examiner*—Jerome Grant, II
(74) *Attorney, Agent, or Firm*—Townsend and Townsend and Crew LLP

(57) ABSTRACT

This invention relates to a scanning device for scanning a document such as a photograph using an image sensor device that uses optics that may have a narrow depth of focus, the scanning avoiding contact of the document by the image sensor device during scanning. That is, the focal volume of the sensor device is at a distance from the image sensor device. The scanning device includes a positioning mechanism that maintains the front surface of the document in the focal volume during scanning.

5 Claims, 7 Drawing Sheets

METHOD AND APPARATUS FOR KEEPING A DOCUMENT IN FOCUS DURING NONCONTACT SCANNING

BACKGROUND OF THE INVENTION

1. Field of the Invention

The invention relates to image scanning, and in particular the design and implementation of scanning devices to allow for the scanning of documents with fragile front surfaces, specifically by providing for positioning a document at the focus of the scanning device without sliding motion occurring across the front surface of the document.

2. Description of the Problem and Prior Art

High-quality "scanning" of the image contents of physical documents, such as business documents, into digital form is routinely accomplished in commercially available devices such as computer-attached document scanners and facsimile machines. Document scanners are used, for example, to convert images to digital form for inclusion in computer files. Facsimile machines transmit the digital information over telephone lines to other facsimile machines, which then recreate a facsimile of the original document. The conversion of the document from physical to digital form is accomplished in an image sensor unit. Traditionally, the image sensor is a charge coupled device (CCD) or a silicon image sensor. Illumination is provided by an illuminating device, while the optics for focusing the surface of the document to the image sensor is provided with one or more mirrors and lenses. This optical arrangement allows both for the possibility of document reduction or enlargement and for control over the depth of field. The depth of field of such an arrangement can be large, making scanning without the necessity of making contact (herein "non-contact scanning") practical with such an optical arrangement.

Recently, a compact integrated device, called a contact image sensor (CIS) has started to be used for the image sensor unit. A CIS typically incorporates illumination, focusing optics in the form of a narrow depth of focus lens array, for example a gradient index lens array (also called a self-focussing lens array), and one or more sensor arrays in one package. The compact unit is often sealed, with illumination and document scanning occurring through a single "scanner window." Scanning devices are constructed so that the CIS image sensor unit scans the width of the document, which is placed at the focus of the unit, while the length of the document is scanned through induced relative motion between the document and the sensor unit. The advantages of a CIS over traditional sensor technology include: ease of manufacturing, reduced component count, fewer moving parts, reduced cost, integrated optics, and environmentally controlled optical path. One of the disadvantages is a rather narrow depth of focus, as described further below.

Relative motion between the document and the image sensor unit is obtained through one of two configurations. The first typically is used by "flat bed" scanners and copiers. In such a configuration, the CIS usually does not have a physical scanner window, and the document is placed on top of a sheet of transparent material with an image scanner located below and focused through the transparent material. The CIS image scanner unit is forced to move the length of the document through a drive mechanism while the document remains stationary. This configuration is not the main area of application of the present invention.

A second configuration is suitable for use in facsimile machines, hand-held scanners and sheet-fed scanners, and is the main area of application of the present invention. In this configuration the CIS unit is arranged so that the focus of the sensor-lens system is coincident with the outer surface of a window that is substantially fixed to the CIS. The document must be placed substantially in contact with the scanner window for the document to be in focus, and document-sensor window contact must be maintained while scanning in order to keep the document in the shallow focal region. Because of the utility of this arrangement, sealed contact image sensors are common in facsimile machines and other inexpensive document scanners, and devices that use them must be configured so that the document to be scanned slides across the scanner window.

Because of the advantages of the contact image sensor arrangement such as relative durability and low cost, there is near ubiquity of facsimile machines and low cost of black and white or gray scale document scanners using this technology. Contact image sensors usually have a very small depth of field however, on the order of two tenths of a millimeter, and so high-quality scanning is accomplished only with a document in good contact with the scanner window. The relatively narrow depth of field of contact image sensors results in design problems that are not present in image sensors where the depth of field can be varied. The recent introduction of color contact image sensors provides yet another design problem: color scanners are used for photographs as well as printed documents, and thus the contact image sensor must be compatible with photographic media. Contact is not a problem with many types of common document material, such as smooth paper. However, scanners based on contact image sensors technology suffer from the inability to scan materials that cannot pass smoothly by the scanner unit. Specifically, photographic documents cannot reliably be used with contact image sensors. This inability manifests itself in the following ways:

1. Due to the soft, water absorbing properties of photographic emulsions, "wetted" contact between the photographic document and the scanner window may occur. When this happens, the coefficient of friction between the document and scanner window is increased, the document sticks to the scanner window, and document transport problems result.

2. The optical properties of the document/scanner window interface vary between wetted and non-wetted contact points. The partial sticking of the photographic document to the window results in streaks or spots on the scanned image which is denoted here as "spotting."

3. Soft photographic emulsions are much more susceptible to damage than are paper documents. Photographic documents may be harmed or scratched as a result of either the direct contact of the sliding contact with the window, or by dirt particles that may come between the document and the scanner window.

The inability to use this type of scanning technology on photographs is acknowledged by manufacturers of scanners, some of who issue protective photograph covers of clear plastic for use when scanning photographs. Thus there is a need in the art for overcoming the problems encountered with scanning by CISs of documents, such as photographs, that may stick to the scanner window or be damaged by contact.

SUMMARY OF THE INVENTION

To summarize, CISs have many advantages over older technologies, including reduced part count and cost and ease of manufacturing and implementation. One feature of CISs that presents a problem is that their small depth of focus demands accurate positioning of the document during scanning. In CIS scanners this is accomplished by: 1) focusing through and onto the outer surface of a scanner window, and 2) dragging the document across the window, hence keeping it in focus during scanning. This action results in a focused image, but can cause the scanner to jam, can damage a fragile document, or can result in certain types of optical problems. One solution is to design the scanning window to reduce sticking to the document. See for example co-owned U.S. patent application Ser. No. 09/xxx,xxx (filed Jul. 16, 1998) *ENTITLED IMPROVED APPARATUS FOR SCANNING DOCUMENTS SUCH AS PHOTOGRAPHS USING A CONTACT IMAGE SENSOR* (Craig et al., inventors). Another solution, presented here, is to adapt the optics to focus on a point away from the image sensor and to include a document positioning mechanism into the scanner design.

In this invention the image sensor may be manufactured, for example, in much the same way as a CIS, with all of its advantages, with the focus at a distance from the image sensor body. In one aspect, a document positioning mechanism keeps the document in focus by 1) providing a set of positioning rollers that are substantially fixed relative to the image sensor to act as a reference for document positioning and 2) a platen for document support that is constrained in its motion by spring and linkage mechanisms. By properly constraining the platen motion, the travel of the document can be controlled such that the possibly fragile front surface of the document is both kept in focus and only comes in contact with the positioning rollers, while the back side of the document slides on the platen. This aspect of the invention is contrasted with prior art scanners that include a spring arrangement to maintain contact between the document and the CIS unit. See for example U.S. Pat. No. 5,463,256 to Oliver Wang et al.. The Wang et al. mechanism requires contact between the CIS and the document to maintain the document in focus, and would not work without such contact. In one aspect of the present invention, the spring mechanism is mechanically constrained to keep the document in focus without contact with the imaging unit.

One object of the present invention is to allow CIS-style scanners to be useful in scanning documents that have the propensity to stick to the scanner window.

Another object of the invention is to reduce the incidence of document jamming that occurs during scanning of photographic documents.

Another object is to reduce the incidence of spotting that occurs during the scanning of photographic documents.

Another object is to reduce the incidence of scratching of documents that occurs during the CIS scanning of documents with fragile image surfaces.

Yet another object is to maintain a document in the focal volume of a non-contact image sensor without substantial sliding friction on the document front-surface.

While the following modifications to reduce friction have been described herein, other modifications will become clear to those of ordinary skill in the art, and this invention is not limited to the specific modifications described herein. In addition, while this invention is designed for the scanning of photographs, it is also generally useful in all scanning applications where sliding contact is to be avoided and in scanning applications in general.

BRIEF DESCRIPTION OF THE DRAWINGS

FIGS. 7a–7c is a top view of yet another embodiment of the document support mechanism using a four-bar linkage.

REFERENCE NUMERALS IN DRAWINGS

Figure 1:
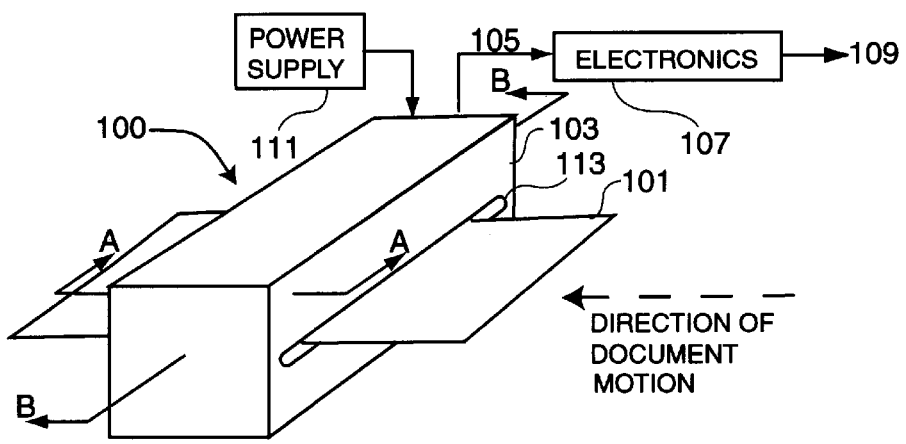
FIG. 1 is a perspective of the scanning device during scanning.

100 Scanning device
101 Document
103 Scanning device body
105 Image sensor output
107 Image sensor electronics
109 Useful output
111 Power supply
113 Scanning device opening
114 Scanning device opening
201 Image sensor
203 First scanner roller
204 Second scanner roller
205 First scanner roller support
206 Second scanner roller support
209 Platen
211 Spring mechanism
213 Torsion bar
215 First scanner roller line of rotation
216 First scanner roller line of rotation
217 Torsion bar mounting hole
219 Torsion bar mounting slot
221 Document front surface
223 Orientation and forcing mechanism
301 Sensor housing
303 Image sensor array
305 Substrate
307 Focusing optics (narrow depfth of field)
309 Light source (illumination unit)
311 Focal volume 313 Light bundle
601 Flexure horizontal part
603 Flexure horizontal part
605 Flexure vertical part
606 Flexure vertical part
607 Platen
613 Platen to flexure attachment location
615 Scanning device body-to-flexure attachment location
703 Four-bar linkage connecting (non-vertical) link
705 Four-bar linkage connecting (non-vertical) link
707 Four-bar linkage vertical link
709 Four-bar linkage vertical link
713 Linkage-scanning device body support
715 Linkage-scanning platen support
803 Scanning device body
811 Spring mechanism
900 Scanning device
901 Scanning device body
905 First scanner roller
905 Second scanner roller
907 First scanner roller support
908 Second scanner roller support
909 Platen
911 Orientation and forcing mechanism
913 Positioning spring
915 Torsion bars
917 First positioning roller
918 Second positioning roller
919 First positioning roller support lines of rotation
920 Second positioning roller support lines of rotation
921 First positioning roller support
922 Second positioning roller support
923 First positioning roller support line of rotation
924 Second positioning roller support line of rotation
1010 Working surface
1101 Platen
1103 First scanner roller
1104 Second scanner roller
1105 Orientation and forcing mechanism
1107 Torsion bar
1109 Spring mechanism
1201 Platen
1203 First scanner roller
1204 Second scanner roller
1205 First orientation and force mechanism
1207 Second orientation and force mechanism

DESCRIPTION OF THE PREFERRED EMBODIMENTS

FIG. 1 shows an external view of a scanning device 100. While FIG. 1 may be a conventional scanner configuration which is prior art, a scanner incorporating the mechanism or any other aspects of this invention is not prior art. Hence FIG. 1 is not labeled "Prior Art." A document 101 passes through a set of scanning device openings 113 located on opposite sides of scanning device body 103. Electrical connections include a power supply 111, and a scanner output 105, which is converted by electronics 107 to a useful output 109. During scanning, document 101 moves through scanning device body 103 in the direction noted on FIG. 1.

Figure 2:
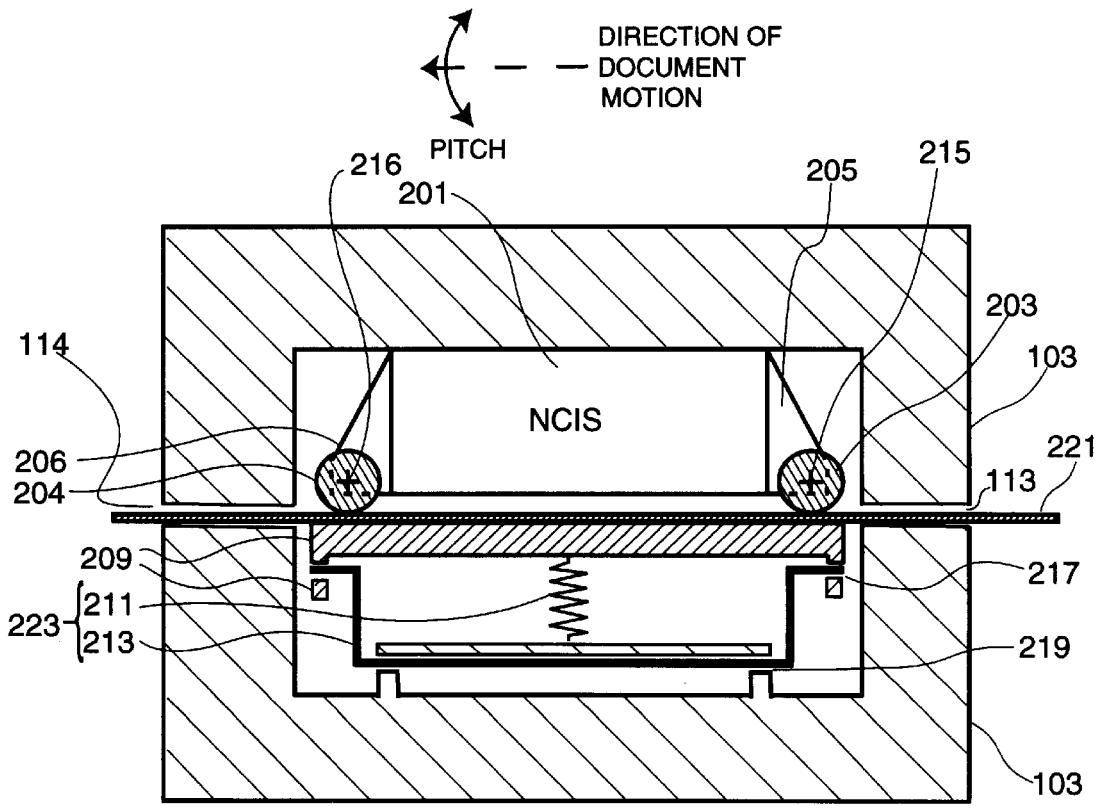
FIG. 2 is a cross-sectional view of the preferred embodiment showing the relative placement of the image sensor and document handling mechanism.

A cross-sectional view of the preferred embodiment of the invention is shown in FIG. 2. This view is through approximately section A—A, as indicated in FIG. 1, of scanning device 100 in a direction perpendicular to the document motion direction, and shows details of the document handling and scanning components. The components that relate to aspects of the invention are an image sensor 201 and the relationship of the sensor to a positioning mechanism, whose purpose in the preferred and all alternate embodiments is mainly to keep the front-surface 221 of the document 101 in focus during scanning. The preferred embodiment of a positioning mechanism includes a set of first scanner rollers 203 and second scanner rollers 204 attached to a corresponding set of roller supports 205 and 206, a platen 209, and an orientation and forcing mechanism 223. The orientation and forcing mechanism 223 is comprised of one or more positioning springs 211, and a pair of torsion bars 213. The number of springs 211 is chosen to evenly impart a force across the width (perpendicular to the direction of motion). The description herein will be for a single spring, and how to modify the design for more springs would be clear to one of ordinary skill in the art. The positioning mechanism is adapted so that prior to scanning, scanner rollers 203 and 204 are substantially in contact with platen 209, with scanner rollers 203 and 204, and image sensor 201 being on the document front-surface 221 side of the document and platen 209 on the opposite side of the document. This embodiment (and others described herein) permits for document scanning in either the direction described herein below and shown in FIGS. 2, 4, 6, 8A, 9, 10, 11, and 12, or in the opposite direction by the use of the positioning mechanism described herein. The action of this mechanism keeps the document front surface in focus by forcing the proper platen motion irregardless of which set of scanner rollers are encountered as the document is fed into the scanner. While this action is the preferred embodiment, other embodiments may incorporate the present invention without enabling bi-directional scanning.

Figure 3:
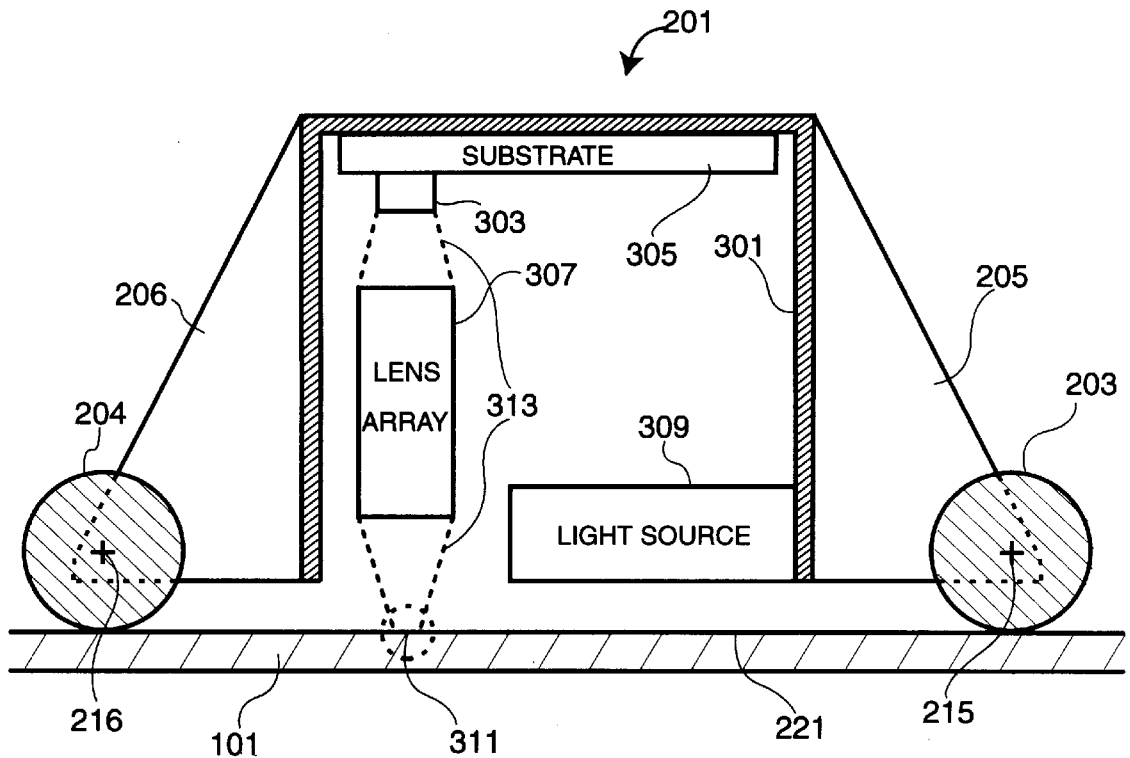
FIG. 3 is a cross-sectional schematic view of the preferred embodiment of a non-contact image sensor with attached scanner rollers.

FIG. 3 is a cross-sectional schematic view of image sensor 201 in the preferred embodiment of FIG. 2, which we call a non-contact image sensor (NCIS) herein. Also shown in FIG. 3 are the elements of the positioning mechanism which are preferably attached to image sensor 201: scanner rollers 203 and 204, and roller supports 205 and 206. Unlike conventional contact image sensors, image sensor 201 has a focal volume 311 that is not in physical proximity to image sensor 201. Thus, image sensor 201 is adapted to image, or focus, the front surface 221 of document 101 without contact. The sensor components that preferably are all attached to the sensor housing 301 are: a sensor array 303, a substrate assembly 305, a set of focusing optics in the form of a narrow depth of focus lens array 307, and an illumination unit (a light source) 309. The narrow depth of focus lens array is preferably a gradient index lens array (also called a self-focussing lens array, e.g., SELFOC Lens Array by Nippon Steel Glass Co., Tokyo, Japan). The sensor array 303 preferably is comprised of individual color sensing elements providing red, green and blue outputs, and the sensor array is arranged along a line parallel to and perpendicular to the direction of scanning, and has an output that is electrically coupled to electronics 107. Note that it is to be understood that a linear array as defined herein includes an arrangement wherein the individual red, green and blue (RGB) sensors may not be arranged linearly, but the gross effect is to sense at least a line of picture elements (pixels) in parallel.

Alternative arrangements such as those in which more than one line of pixels is sensed at a time also are included under the definition of "arranged in a line." Power supply 111 provides power to the light source. The side of image sensor 201 facing document 101 may be open or covered with a transparent covering, and the preferred embodiment shown in FIG. 3 has no covering. Focusing optics 307 are adapted to bring light from focal volume 311 to sensor array 303 preferably with 100% magnification. In the preferred embodiment the focusing optics is a gradient index fiber optic array, such as a Nippon Sheet Glass SLA20DF (NSG America, Inc., Somerset, N.J., and Nippon Sheet Glass Co. Ltd., Tokyo, Japan) or similar product. The extreme boundaries of light rays passing from focal volume 311 to sensor array 303 define a light bundle 313, which must pass from focal volume 311 to focusing optics 307, and from focusing optics 307 to sensor array 303, without striking any non-transmitting bodies. The cross-sectional view shown in FIG. 3 is representative of the entire width of image sensor 201 (except for the case of more than one roller on each side of the CIS). All of the components essentially span the width of document 101 although longer or shorter mechanisms also may be built. In particular, focal volume 311, and thus the scanned portion of document front surface 221, preferably span the width of scanning device body 103 shown in FIGS. 1 and 2.

There are two rollers, 203 and 204, each situated on either side of image sensor 201 relative to the direction of motion. In the preferred embodiment, to accommodate the width, and to keep costs down, each of the rollers 203 and 204 is comprised of two rollers as seen in the perspective view of FIG. 4. However, for simplicity in explanation, 203 and 204 shall be each referred to as one roller, it being understood that this may be one roller, or more than one roller along the width of any document. Rollers 203 and 204 are mounted along their respective lines of rotation 215 and 216 to respective roller supports 205 and 206 using any method that will allow the rollers to rotate along the lines of rotation. The rollers and platen 209 (see FIG. 2) are adapted so that in the absence of a document in the scanner there is platen-to-roller contact and the platen intersects focal volume 311 (see FIG. 3). Thus if the document front surface contacts the platen and all of the scanner rollers, it will also pass through the focal volume, and hence will be in focus during scanning. Not shown herein are any drive elements such as belts and gears and motors and motor controls needed to drive a document through the scanner, and how to so include these elements would well understood by those of ordinary skill in the art.

Figure 13:
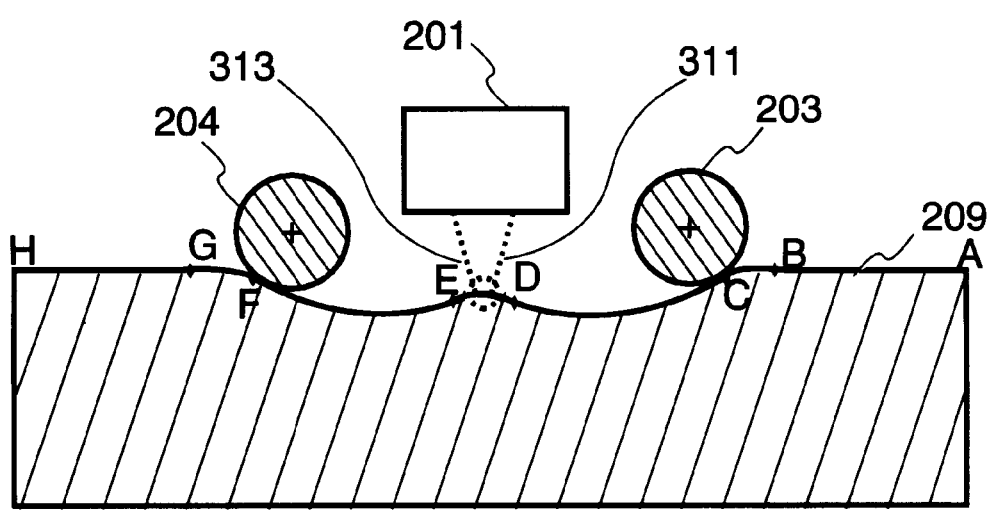
FIG. 13 is a cross-sectional view of the preferred embodiment of the platen.

The preferred embodiment of the platen is not substantially flat, but has curvature to induce a slight curvature in the document during scanning in order to aid in guiding the document through the focal volume. In addition, the platen curvature shape is adapted to allow the document to remain in focus whether the direction of document motion is that indicated in the figures or in the opposite direction. That is, it is symmetric with respect to a horizontal center line perpendicular to the direction of scanning. This shape, along with the positioning mechanism, allow for scanning to proceed in either the direction indicated on the figures, or in the opposite direction. Alternate embodiments may use a shape than enables only unidirectional scanning, as would be clear to one of ordinary skill in the art. A cross sectional view of the preferred embodiment of the platen shape is shown in an exaggerated form in FIG. 13. Note that because the curvature is slight, platen 209 and document 101 appear flat in FIGS. 2 and 3. The surface is substantially smooth so the document encounters no sharp edges during scanning. Points A through H on the platen surface are indicated on FIG. 13. On sections AB and GH, the platen is substantially flat. In the platen region between the rollers, the platen surface is composed of five arcs: arcs BC, CD, DE, EF, and FG. The scanner rollers in contact with points C and F will be denoted as the first and second scanner roller, respectively. Arc BC and CD have a common tangent at point C with a first scanner roller 203. Similarly, arcs EF and FG have a common tangent with the second scanner roller 204 at point F. In addition, section AB and arc BC, arcs CD and DE, arcs DE and EF, and arc FG and section GH intersect at common tangents, resulting in a smooth platen surface. Also, the point on arc DE closest to the NCIS 201 is both in focal volume 311 and is at the common tangent to all the scanner rollers. As would be clear to one of ordinary skill in the art, there are other shape arrangements, including a flat platen, various sets of five arcs, and many sets of less than or greater than five arcs that meet the requirement of having a platen that substantially contacts scanner rollers 203 and 204 and has a surface passing through the focal volume 311. The shape indicated in FIG. 13 is one shape that will force the document after passing through the first scanner roller along the platen surface up to the focal volume. As the document proceeds through the scanner, the second scanner roller is encountered, forcing the document to take the platen contour. To ensure smooth conveyance of the document through the scanner, the tangent of arc CD at point D should be close to point F, allowing the document to smoothly pass under the second roller. From the description of the shape of the platen contour, it is understood that a document traversing from the second to first set of rollers would also take the contour of the platen and pass through the focal volume.

Figure 4:
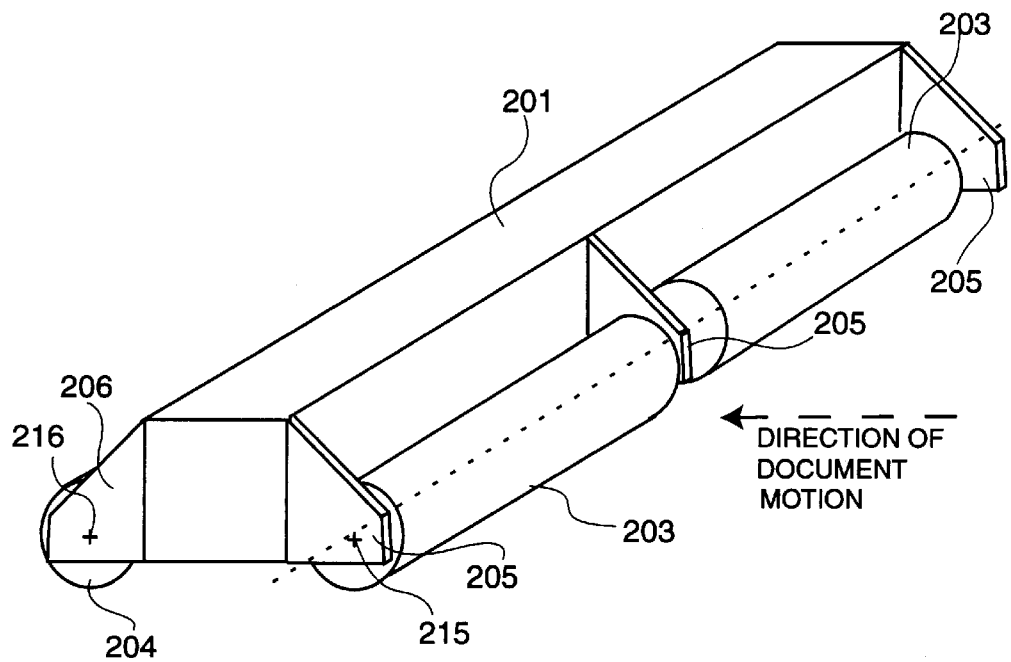
FIG. 4 is a perspective view of the preferred embodiment of the image sensor unit with attached scanner rollers.

FIG. 4 is a perspective view of image sensor 201 and that part of the positioning mechanism incorporated into the design of image sensor 201. This view shows details of how the scanner rollers are incorporated into the image sensor. Two scanner rollers on each side of the image sensor provide support to the width of the document along the width of the image sensor. More or fewer such rollers may be used. The positioning mechanism shown provides a means for positioning the document in the focal volume during scanning without sliding friction occurring on the document front surface.

Figure 5:
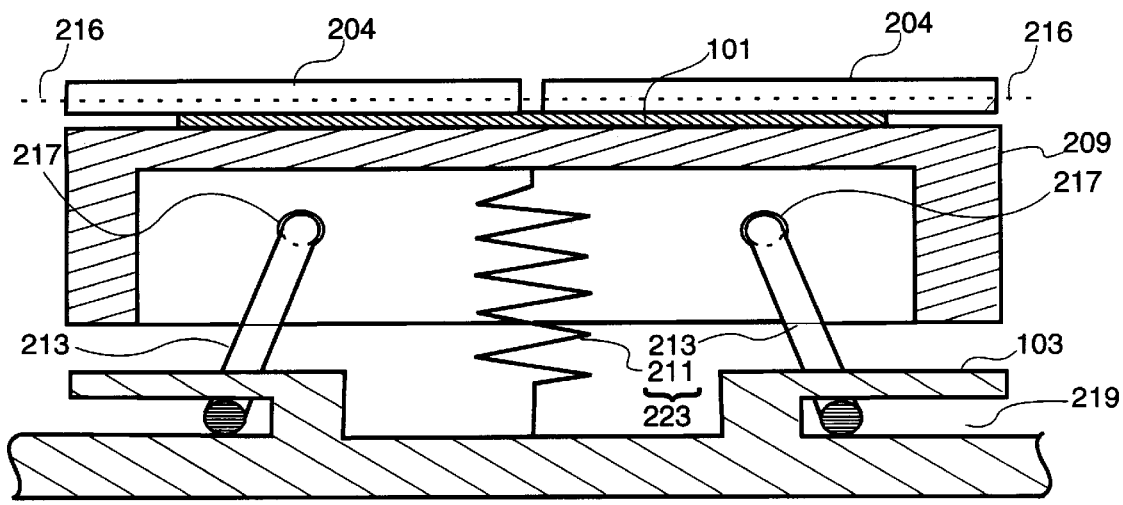
FIG. 5 is a cross-sectional view of the preferred embodiment of the document support mechanism in which the document is supported by a platen.

FIG. 5 is a detailed cross-section view of the positioning mechanism in a direction perpendicular to the direction of document motion. The view of FIG. 5 is indicated by B—B in FIG. 1. Platen 209 has a length and width sufficiently large to support the document to the maximum extent of the focal volume, and preferably has a width approximately equal to scanning device openings 113 (not shown in FIG. 5) and, referring to FIG. 2, a length (in the direction of motion) approximately equal to the spacing between scanner rollers 203 and 204. Other embodiments may have different length elements. Torsion bars 213 are located near the extreme width ends of platen 209, as shown in FIG. 5, aligned substantially with the direction of document motion. Torsion bars 213 are attached to platen 209 through some torsion bar mounting holes 217, allowing the bars to rotate along an axis approximately parallel to the direction of document motion. In addition, each torsion bar 213 has a substantially straight component that is approximately parallel to the direction of document motion (see FIG. 2). The straight part of torsion bar 213 passes through a torsion bar mounting slot 219 in scanning device body 103.

Positioning spring 211 is located in the approximate center of platen 209, precompressed to produce a force on the platen towards the image sensor 201. While platen 209 can move towards or away from scanner rollers 203 and 204, the action of torsion bars 213 restricts the pitching motion of platen 209 relative to the direction of document motion, and thus the platen will remain essentially parallel to the scanner rollers, and hence the focal volume.

The actions of the elements of the preferred embodiment of the invention that enable document scanning to occur substantially without sliding friction occurring on document front surface 221 are now described in more detail.

The positioning mechanism shown in FIGS. 2, 4, and 5, using the image sensor 201 shown in FIG. 3, and platen 209 shown in FIG. 13, allows for non-contact scanning by keeping document front surface 221 in focal volume 311 at all times during scanning. Prior to scanning, platen 209 is forced against and substantially contacts the scanner rollers 203 and 204 by action of spring 211. As noted previously, scanner rollers 203 and 204 are adapted with a mutual tangent of all the scanner rollers passing through the focal volume 311. As document 101 is fed through scanning device body 103 through first scanning device opening 113, it substantially contacts a first set of scanner rollers 203 and platen 209. Scanner rollers 203 are substantially fixed relative to the body of scanning device 103, and the spring loaded platen moves away from the rollers, the movement being by the thickness of the document. Torsion bars 213 restrict the pitching motion of platen 209, and thus platen 209 remains approximately parallel to scanner rollers 203 at all times. As document 101 slides along platen 209, document front surface 221 eventually passes through focal volume 311, since platen 209 has been forced to move perpendicularly and away from image sensor 201 by the thickness of document 101. The motion of document 101 through scanning device body 103 then results in document 101 contacting a second set of scanner rollers 204 before exiting scanning device body 103 through a second scanning device opening 114 (see FIG. 2).

In the preferred embodiment, the incorporation of scanner rollers 203 and 204 into image sensor 201 results in a compact, easily assembled unit that will always result in focused optics. To enable document 101 to be scanned without harm to document front surface 221, scanning device rollers 203 and 204 should be made of a material that will inhibit scratching and/or sticking, preferably by choosing a soft, rubber-like material that is softer than document front surface 221. Platen 209 may be made of any rigid material with moderate coefficients of friction, preferably plastic. The one or more positioning springs 211 can be any springs or tensioned pieces connected to platen 209 that will force platen 209 against scanner rollers 203, including but not limited to a helical or straight spring component attached to any portion of platen 209 and scanning device body 103 that results in a force towards image sensor 201. The inclusion of such a spring for this purpose would be clear to one of ordinary skill in the art.

Many combinations of spring and positioning mechanisms are possible for maintaining the platen at a specified distance and orientation to the image sensor, all within the scope of the invention. In the preferred embodiment, the image sensor is substantially fixed to the scanning device body 103 while the platen is mechanically coupled to the scanning device body 103 through a spring mechanism. The preferred embodiment shown in FIG. 3 has the location of image sensor 201 and scanner rollers 203 and 204 substantially fixed relative to scanning device body 103, and platen 209 is forced towards the scanner rollers. The objectives of this invention can also be achieved through other embodiments.

Figure 11:
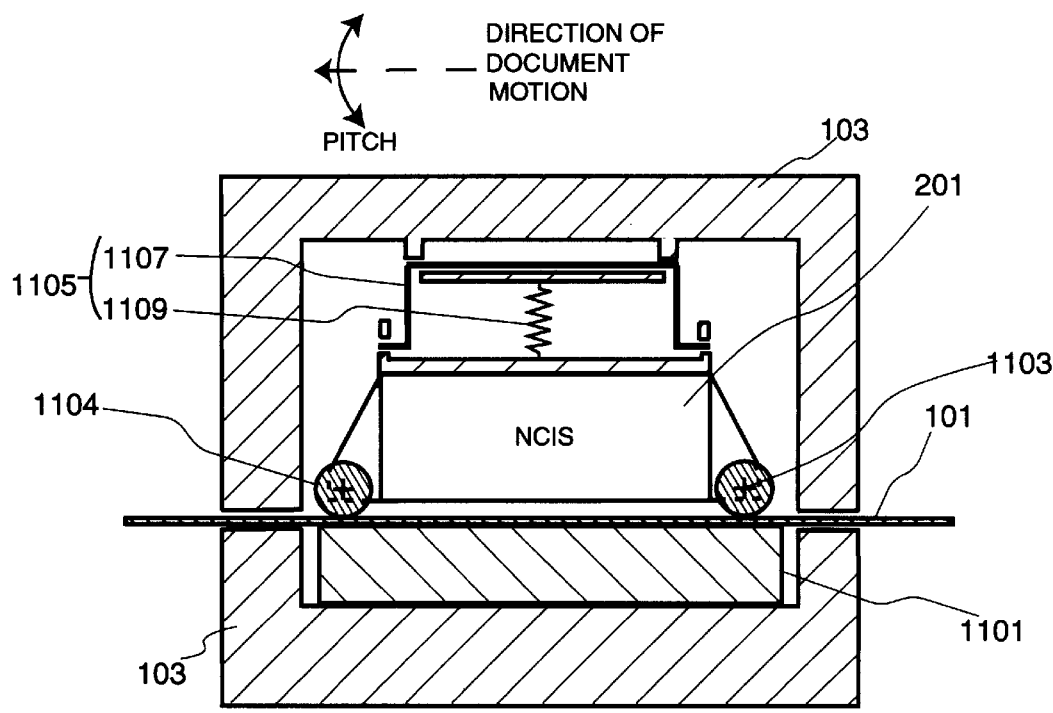
FIG. 11 is a cross-sectional view of another embodiment with the platen coupled to the scanner housing and the image sensor maintained parallel to the platen.
Figure 12:
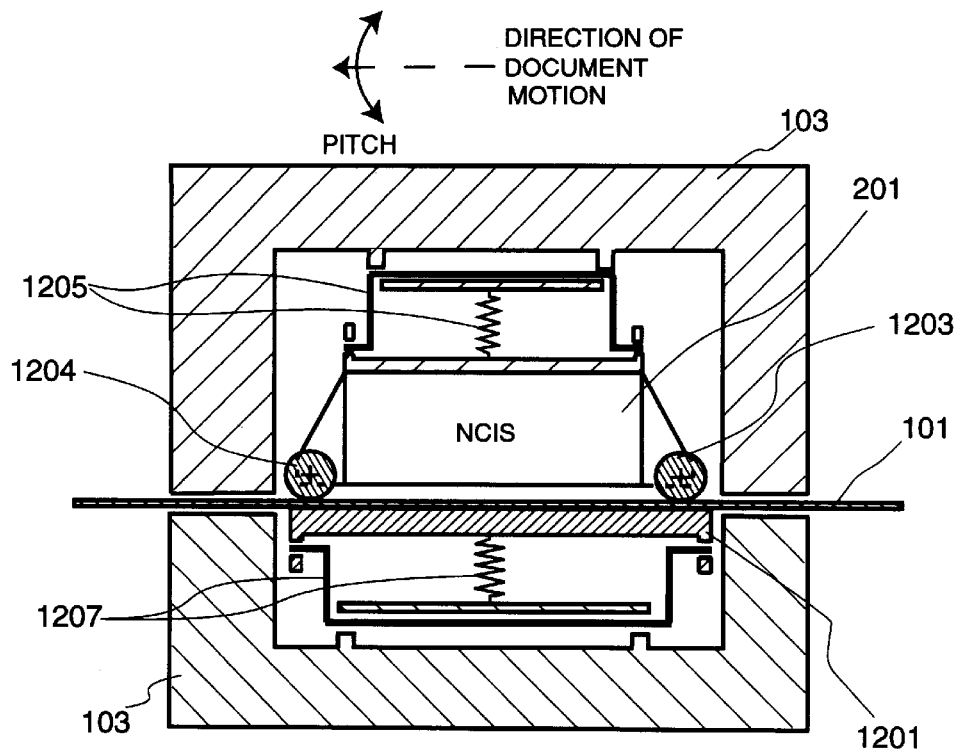
FIG. 12 is a cross-sectional view of yet another embodiment with the platen and image sensor maintained parallel to each other.

In another embodiment, shown in FIG. 11, a platen 1101 is substantially fixed and image sensor 201 and a set of scanner rollers 1103 and 1104 are forced towards the platen by an orientation and forcing mechanism 1105, shown here comprised of a torsion bar 1107 and a spring mechanism 1109. In yet another embodiment, shown in FIG. 12, both a platen 1201 and a set of scanner rollers 1203 and 1204 are mutually forced towards each other by a first orientation and force mechanism 1205 and a second orientation and force mechanism 1207.

More combinations of positioning mechanisms (with and without spring mechanisms) for maintaining the platen at a specified distance from and orientation to the image sensor, all within the scope of the invention, are now described.

Figure 6:
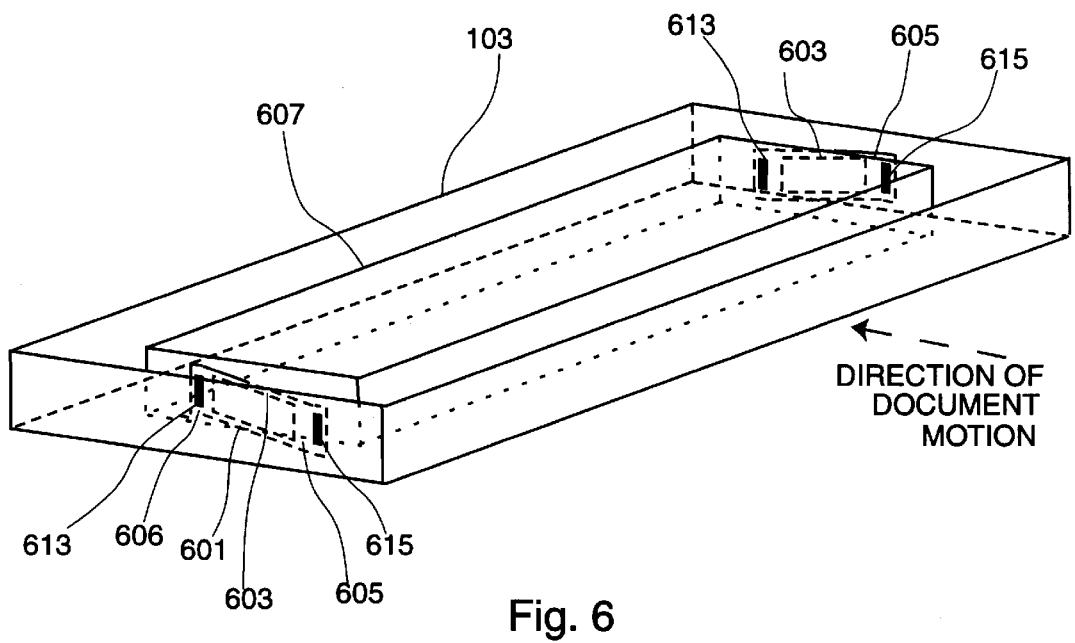
FIG. 6 is a perspective view of another embodiment of the document support mechanism using a flexure.

In another embodiment, shown in FIG. 6, an orientation and forcing mechanism is comprised of a pair of flexures each attached to opposites ends of the scanning device body 103 and a platen 607. A flexure is a rectangular shaped flexible member capable of undergoing elastic deformation. Each flexure is oriented with two horizontal parts 601 and 603, and two vertical parts 605 and 606. With the flexure thus oriented, one vertical part 605 is attached to one face of scanner body 103 using an attachment means at attachment location 615, the face parallel to the direction of motion, and the other vertical part 606 is attached using an attachment means at attachment location 613 to the nearest vertical face of the platen which is parallel to the direction of motion. Both flexures are so attached at each wide end face of the platen 607 as shown in FIG. 6. The attachment preferably is symmetric along the center line of the plane parallel to the direction of motion. For each flexure, as one vertical part 605 moves relative to the other vertical part 606, the horizontal parts 601 and 603 will twist and bend (undergoing torsion), causing the motion to be nearly vertical while providing a restoring force to return the flexure to its original bent but untwisted shape. Thus the flexures provide force as well as the motion restraining action of the linkage. Each flexure permits the end of the platen to which it is attached to move in the vertical direction, the top surface remaining parallel and provides an upwards force. The symmetric arrangement of two flexures keeps the platen horizontal while moving in the vertical direction. The flexure material preferably is chosen and the flexures initially pre-tensioned to provide the predetermined restoring force so that platen 607 is forced against scanner rollers 203 (the rollers not shown in Fig.6), so that no spring is necessary. In another embodiment, a spring mechanism also is used to give additional restoring force.

Note that in this embodiment the reference numerals 607 denote the platen which may be equivalent to the element denoted with reference numerals 209 in the embodiment shown in FIGS. 2, 3, 4 and 5. It would be clear to one skilled in the art that this element 607 in FIG. 6 may be identical to element 209, or may be a different element with similar function.

Figure 7A:
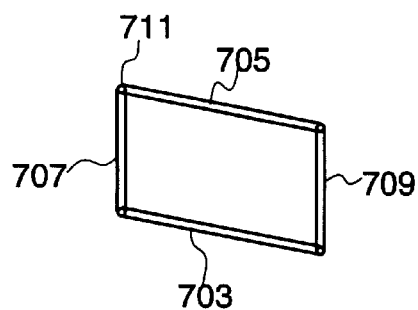
Figure 7B:
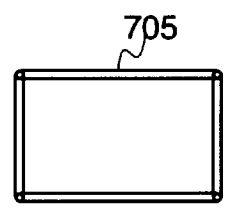
Figure 6C:
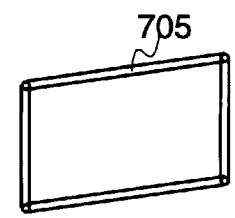

A four-bar linkage is comprised of four rigid bars or links, each of which is hinged at its ends to two of the other bars to form a parallelogram. Such a four-bar linkage is shown in FIGS. 7A, 7B, and 7C in three different positions. Referring to FIG. 7A, a typical four bar linkage has two vertical links 707 and 709, and two connecting (non-vertical) links 703 and 705. In general, the links can have any cross section (e.g., round or square). The hinges (e.g., hinge 711) can be formed by attaching the links with a pin that runs through holes through the ends of the links, or, if the links have a square or rectangular cross section, by adhesively attaching tape to each end.

Figure 8A:
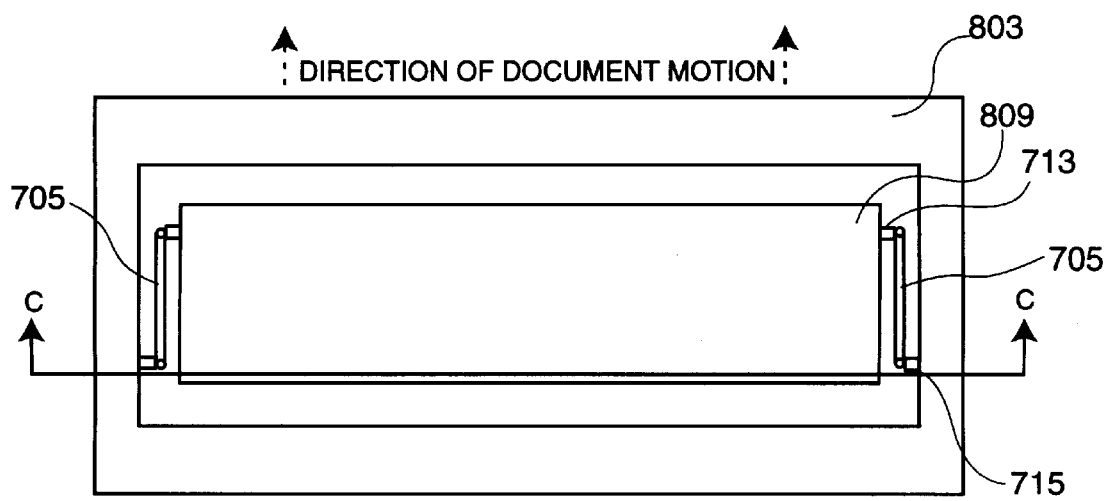
FIGS. 8a & 8b is a side view into the direction of document motion of the FIG. 7 embodiment of the document support mechanism using a four-bar linkage.
Figure 8B:
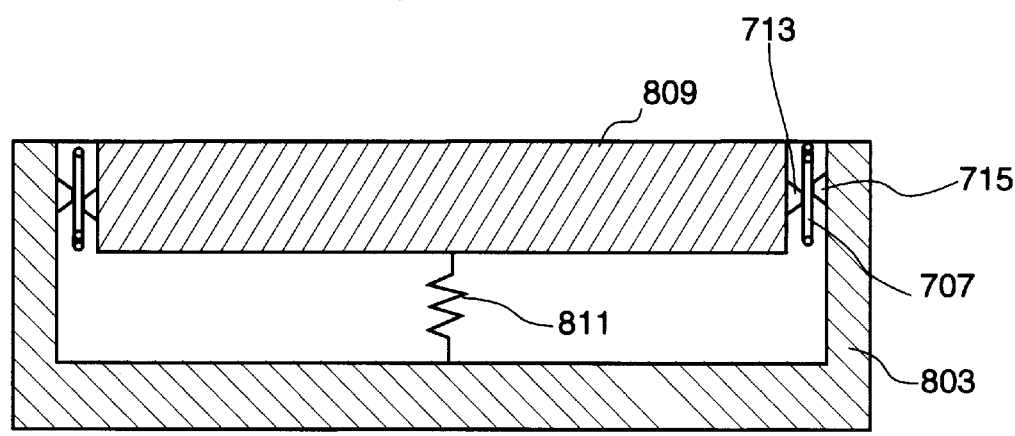

Yet another embodiment of the positioning and spring mechanisms, shown as a top view in FIG. 8A and as the cross-section C—C of FIG. 8A in FIG. 8B, includes a set of one or more four-bar linkages. Two four-bar linkages preferably are used. One vertical link 709 of each four-bar linkage is attached to a parallel vertical face of platen 809, the faces parallel to the direction of motion, the attachment using support 713 at a first attachment location. The second vertical link 707 of each four-bar linkage is attached to the scanner body 803 using support 715 at a second attachment location. As seen in FIG. 8A, the two four-bar linkages are attached symmetric to the center line of the platen which is parallel to the direction of motion. The vertical members are kept parallel to the vertical faces of platen 809. Thus, referring to FIG. 8B, the platen is restricted to moving vertically, and the top surface is always kept horizontal. Note that the support of the links to the faces of platen 809 and scanner body 803 preferably are rigid, at right angles to the plane of the four-bar linkage, and the linkage plane is preferably parallel to the faces of platen 809 and scanner body 803 to which the linkages are attached. The minimum number of linkage supports needed to obtain the proper platen motion is a single four-bar linkage on one end. The addition of one or more linkages on the other end adds rigidity to the overall mechanism, as would adding one or more linkages to the same end.

The action of the four-bar linkage is controlled by the connecting (non-vertical) links. In an alternate embodiment, the equivalent motion of a single four-bar linkage may be achieved by using two one-bar linkages (again, rigid bars) with the faces of the platen and of the scanner body forming the vertical components. In such an arrangement, for each one-bar linkage, a pin is used on the vertical face of the platen which is parallel to the direction of motion, and another pin is used on the closest vertical face of the scanner body in the same horizontal plane, separated by some distance. That is, the center lines of the pins are offset by some distance. A link with holes that can be aligned with and attached to the pins fixes each end relative to each face and allows for rotation. This thus acts as one of the connecting (non-vertical) links of a four-bar linkage. A similar set of holes and links located above (or below) the first set acts as the second connecting link. The combined restraining action of these two links is identical to a single four-bar linkage. Thus, it will be understood herein and in the claims that a four-bar linkage may include distinct vertical members, or may use the vertical faces as the vertical links.

The four-bar linkage embodiment includes a spring mechanism 811, as described in the preferred embodiment, for imparting a force on platen 809 to force it against the rollers.

Note that in these embodiments the reference numerals for the platen, body and spring mechanism are different from those used for these elements in the embodiment shown in FIGS. 2, 3, 4 and 5. It would be clear to one skilled in the art that these elements may be identical to or different from elements with similar function in the various embodiments.

Figure 9:
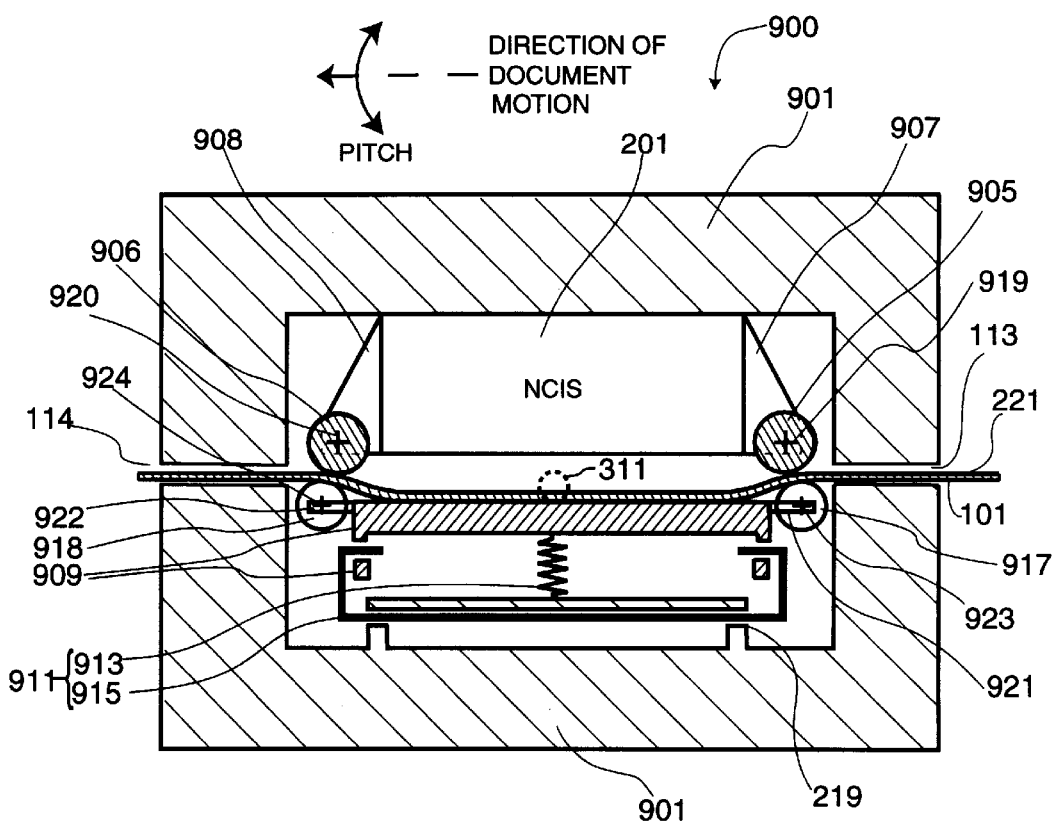
FIG. 9 is cross-sectional view of yet another embodiment of the positioning mechanism with an induced document curvature.

Yet another embodiment of a scanning device with scanning device body 901, shown as a cross-section in FIG. 9, has a curvature induced in the document to add stability to the document during scanning. Key components of this embodiment include the image sensor 201 and its relationship to a positioning mechanism, whose purpose is to keep the document front-surface 221 in focus during scanning. In this embodiment, the positioning mechanism is comprised of two scanner rollers 905 and 906 attached to a roller supports 907 and 908, respectively, through roller support lines of rotation 919 and 920, respectively, a document support mechanism, and an orientation and forcing mechanism 911. The document support mechanism is comprised of a platen 909 and a pair of positioning rollers 917 and 918 attached to positioning roller supports 921 and 922, respectively, through positioning support lines of rotation 923 and 924, respectively. The orientation and forcing mechanism 911 is comprised of one or more positioning springs 913 (one spring is shown), and a pair of torsion bars 915. The positioning mechanism is adapted so that prior to scanning, scanner rollers 905 and 906 are substantially in contact with positioning rollers 917 and 918, with image sensor 201 and scanner rollers 905 and 906 on the document front-surface 221 side of the document and with positioning rollers 917 and 918 and platen 909 on the opposite side of the document. Positioning rollers 917 and 918 and scanner rollers 905 and 906 are adapted so positioning rollers 917 and 918 have a greater separation distance than scanner rollers 905 and 906, and, in the absence of a document, platen 909 intersects the image sensor focal volume 311.

The action of this embodiment is similar to the embodiment of FIGS. 2–5, with the additional inducement of curvature in the document. The action of the positioning mechanism as document 101 traverses through the scanner is now considered. As document 101 passes between the first set of scanner rollers 905 and positioning rollers 917, the document support mechanism moves away from image sensor 201 by the thickness of document 101. The mismatch in scanner roller line of rotation 919 and positioning roller line of rotation 923 results in document 101 bending away from image sensor 201, and towards platen 909. Document 101 then touches the platen and moves along the platen. Since the platen in the absence of a document is located in image sensor focal volume 311, and since the platen along with the document support mechanism has moved away from image sensor 201 by the thickness of the document, document front surface 221 will pass through the scanner in focus. The document then passes through the second set of rollers (906 and 918) and out of scanning device body 901. The document curvature induced by this combination of mechanisms will add structural stability to the document along the width of the focal volume (that is, the horizontal direction perpendicular to the direction of motion) while forcing it to slide along the platen. This action will make it easier to maintain the document in the focal volume during scanning. The action of the positioning mechanism keeps the document in focus even if the direction of scanning is opposite to that indicated on FIG. 9.

Figure 10:
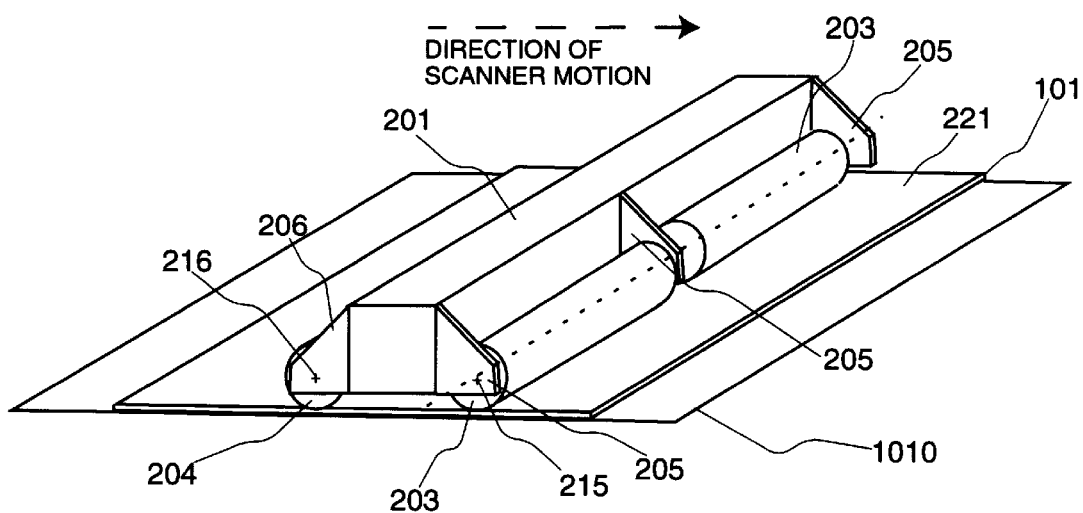
FIG. 10 is a perspective view of a hand-held scanner embodiment of this invention.

An additional embodiment of the invention is shown as a perspective view in FIG. 10. In this embodiment, the configuration of FIGS. 3 and 4 is adapted for use as a hand-held scanner. It would be understood by those of ordinary skill in the art that the main difference between a hand held scanner and an automatic scanner is how the relative motion between the document and the scanner sensor is achieved. In a hand-held scanner, this is achieved by manual motion. The non-contact image sensor with scanner rollers can be used as the workings of a hand-held scanner. Scanner rollers 203 and 204 are adapted so that the mutual tangent of the scanner rollers passes through focal volume 311 (shown in FIG. 3), and thus document front surface 221, placed on a working surface 1010 remains in focus during scanning.

In another embodiment, for which FIG. 10 is also applicable, the configuration of FIGS. 3 and 4 is adapted to be removable from those parts of the scanner body that achieve the powered relative motion, so that the scanner may be used as an automatic scanner, or, with the roller and non-contact scanner mechanism removed, used as a hand-held scanner.

Hence, although this invention has been described with respect to preferred embodiments, those embodiments are illustrative only. Many combinations of spring and orientation mechanisms, attached to components on either side of the document have been shown to maintain the document in focus without inducing substantial sliding friction of the front-surface. In addition, mechanisms including straight and curved document motion have been described in detail. No limitation with respect to the preferred embodiments is intended or should be inferred. It will be observed that numerous variations and modifications may be effected without departing from the true spirit and scope of the novel concept of the invention, and it is intended that the scope of the invention be defined by the claims appended hereto.

What is claimed is:

1. A scanner for scanning a document comprising:
   (a) an image sensor module comprising
      (i) an image sensor housing having a first end adjacent a focal volume for placement of said document:
      (ii) a light-sensitive sensor array mounted in said image sensor housing facing said first end;
      (iii) a light source mounted in said image sensor housing facing said first end;
      (iv) focusing optics, having a narrow depth of focus, mounted between said light sensitive sensor array and said first end of said image sensor housing;
   (b) a first roller;
   (c) a second roller;
   (d) a platen mounted between said rollers and adjacent said first end of said image sensor housing, such that said document is sandwiched between said rollers and said platen, and said platen supports said document to maintain a spacing between said first end of said image sensor housing and said document, so that said document does not touch said image sensor housing;
   (e) wherein said focusing optics focuses light from said focal volume onto said light sensitive sensor array, said focal volume being outside said first end of said image sensor housing and including said document; and
   (f) wherein said platen has a convex top surface in said focal volume, and concave top surfaces on either side of said convex top surface.

2. The scanner of claim 1 wherein said focusing optics have a narrow depth of focus of approximately two tenths of a millimeter.

3. The scanner of claim 1 further comprising:
   a scanner body;
   a positioning spring coupled between said scanner body and said platen for biasing said platen toward said image sensor housing; and
   a pair of torsion bars mounted between said platen and slots in said scanner body to resist pitching motion of said platen relative to the direction of motion of said document to maintain said document in said focal volume.

4. The scanner of claim 1 further comprising:
   a scanner body; and
   a pair of flexures attached between said scanner body and said platen for maintaining said platen level and in said focal volume.

5. The scanner of claim 1 further comprising:
   roller supports for said first and second rollers, said roller supports being mounted to said image sensor housing to maintain said rollers at a position where said document will be moved by said rollers in said focal volume.

* * * * *